United States Patent [19]

Coran et al.

[11] 4,348,501

[45] Sep. 7, 1982

[54] THERMOPLASTIC COMPOSITIONS OF EPICHLOROHYDRIN RUBBER AND CARBOXY-ETHYLENE POLYMER RESIN

[75] Inventors: Aubert Y. Coran; Raman Patel, both of Akron, Ohio

[73] Assignee: Monsanto Company, St. Louis, Mo.

[21] Appl. No.: 258,186

[22] Filed: Apr. 27, 1981

[51] Int. Cl.$^3$ ............... C08L 15/02; C08L 63/00; C08L 23/08
[52] U.S. Cl. .................................. 525/179; 525/187
[58] Field of Search .............................. 525/187, 179

[56] References Cited

U.S. PATENT DOCUMENTS

| | | | |
|---|---|---|---|
| 3,264,272 | 8/1966 | Rees | 525/326 X |
| 3,365,520 | 1/1968 | Foster et al. | 525/221 X |
| 3,454,676 | 7/1969 | Busse | 260/897 |
| 3,657,393 | 4/1972 | Komuro et al. | 525/187 |
| 3,968,065 | 7/1976 | Morris et al. | 525/187 |
| 4,288,570 | 9/1981 | Coran et al. | 525/187 |

Primary Examiner—Carman J. Seccuro
Attorney, Agent, or Firm—Larry R. Swaney

[57] ABSTRACT

Thermoplastic compositions are described comprising blends of epichlorohydrin rubber and carboxy containing ethylene polymer resin.

11 Claims, No Drawings

THERMOPLASTIC COMPOSITIONS OF EPICHLOROHYDRIN RUBBER AND CARBOXY-ETHYLENE POLYMER RESIN

This invention relates to thermoplastic compositions and, more particularly, to thermoplastic compositions comprising blends of cross-linked epichlorohydrin rubber and carboxy containing ethylene polymer resin.

BACKGROUND OF THE INVENTION

Blends of ionomer resins and elastomers are known, U.S. Pat. No. 3,454,676. Curing of such blends is described, but the resulting cured blends would be expected to be thermoset, i.e., not processable as a thermoplastic.

SUMMARY OF THE INVENTION

It has now been discovered that compositions, comprising blends of thermoplastic carboxy containing ethylene polymer (CEP) resin and cross-linked epichlorohydrin rubber dispersed throughout the resin as small discrete particles, exhibit valuable combinations of properties including rubberlike elasticity while maintaining the processability of thermoplastics. The relative proportions of CEP resin and cross-linked epichlorohydrin rubber of the elastoplastic compositions of the invention are not subject to absolute delineation because the limits vary, due to a number of factors including type, molecular weight, or molecular weight distribution of the CEP resin or epichlorohydrin rubber, the type and amount of curative used to cure the rubber and the type and amount of particulate filler or plasticizer. The amount of CEP resin must be sufficient to impart thermoplasticity to the compositions, and the amount of cross-linked epichlorohydrin rubber must be sufficient to impart rubberlike elasticity to the composition. The term "rubberlike elasticity" means for the composition to have a tension set value of about 50% or less. The range of proportions for which the composition is elastoplastic may be ascertained in a few simple experiments by those skilled in the art by following the teachings herein. Generally, elastoplastic compositions of the invention comprise blends of about 15–85 parts by weight of CEP resin, and correspondingly, about 85–15 parts by weight of cross-linked epichlorohydrin rubber. Blends containing higher proportions of cross-linked epichlorohydrin rubber generally exhibit better tension set, whereas, blends containing higher proportions of CEP resin exhibit higher stress-strain properties including true stress at break, TSB.

It is important for thermoplasticity that the cross-linked rubber is present in the form of small dispersed particles, otherwise, the composition will either be weak or not processable as a thermoplastic. If the rubber is not dispersed and forms a somewhat continuous phase throughout the blends, a thermoset composition not processable as a thermoplastic may be obtained. The dispersed rubber particles must be small enough to maintain strength and thermoplasticity of the composition. If the particles are too large, weak, low strength blends are obtained. Compositions containing still larger particles may not be processable as thermoplastics. Accordingly, it is understood that, in elastoplastic compositions of the invention, the rubber particle size is small enough to maintain high strength and thermoplasticity. Generally, the cross-linked rubber particles are of a size of about 50 microns number average or less. The smaller the particle size, the better the properties, including strength and processability. Preferably, the particle size is about 10 microns number average or less. The dynamic vulcanization process as described below, when carried out properly, can give cross-linked rubber particles within the even more preferable range of about 0.1 to 2 microns number average.

In order to achieve the improved compositions of the invention, it is essential that the epichlorohydrin rubber is cross-linked with enough rubber curative so that the rubber is cross-linked sufficiently to give a composition having a substantially greater tensile strength than a corresponding blend containing uncured rubber. Preferably, sufficient rubber curative is used to give a 25 percent or more increase in tensile strength of the similar blend in which the rubber is uncured.

Elastoplastic compositions of the invention are preferably prepared by a dynamic vulcanization process which comprises masticating a mixture of melted CEP resin, epichlorohydrin rubber, and curative at a curing temperature until cross-linking is complete. Conventional rubber masticating equipment, for example, Banbury Mixers, Brabender Mixers, and mixing extruders, may be used to carry out the dynamic vulcanization process. The CEP resin and epichlorohydrin rubber typically are well mixed at a temperature above the melting temperature of the CEP resin, after which curative is added. Mastication at vulcanization temperature is continued until vulcanization is complete, generally within a few minutes, depending on the temperature. To obtain thermoplastic elastomeric compositions, it is desirable that mixing continues without interruption until vulcanization is complete. If appreciable curing is allowed after mixing has stopped, a thermoset unprocessable composition may be obtained. Frequently, the cured blend is removed from the mixer and cooled, then returned and masticated again above the melting temperature of the CEP resin.

The additional mastication step may generally improve the processability of the composition, especially when higher proportions of rubber are used. For further details concerning dynamic vulcanization and determination of the extent of cure of the rubber, refer to the Coran et al U.S. Pat. Nos. 4,104,210 and 4,141,863.

The particular results obtained by the aforesaid dynamic vulcanization process are a function of the particular rubber curing system selected. Preferably, enough curative is used to cross-link the rubber to the extent that the cross-link density of the rubber is in the order of about $3 \times 10^{-5}$ to $3 \times 10^{-4}$ moles per milliliter of rubber. Of course, the cross-link density should not be too high lest the properties of the composition be impaired.

Methods other than dynamic vulcanization can be utilized to prepare thermoplastic elastoplastic compositions of the invention. For example, epichlorohydrin rubber can be fully vulcanized in the absence of the CEP resin, comminuted, and mixed with molten CEP resin. Provided that the cross-linked rubber particles are small, well dispersed and in an appropriate concentration, thermoplastic compositions within the invention are obtained by blending cross-linked epichlorohydrin rubber and CEP resin. In addition, provided that enough CEP resin is present, thermoplastic compositions may be prepared by masticating blends of CEP resin and epichlorohydrin rubber, incorporating curatives and then curing under static conditions, such as, in a mold. In such a case, generally a higher concentration of CEP resin is used, e.g., more CEP resin than rubber.

A thermoplastic composition of the invention is processable in an internal mixer, to give a product which, upon transferring at a temperature above the softening temperature of the CEP resin to the rotating rolls of the rubber mill, forms a continuous sheet. The sheet is reprocessable in the internal mixer, after reaching a temperature above the softening or melting point of the CEP resin. The material is again transformed to the plastic state but upon passing the molten product through the rolls of the rubber mill a continuous sheet again forms. In addition, a sheet of thermoplastic composition of this invention can be cut into pieces and compression molded to give a single smooth sheet with complete knitting or fusion between the pieces. It is in the foregoing sense that "thermoplastic" will be herein understood. In addition, thermoplastic compositions of the invention are further processable to the extent that articles may be formed therefrom by extrusion, injection molding, or calendering.

Epichlorohydrin rubbers satisfactory for the practice of the invention are rubbery homopolymers of epichlorohydrin (ASTM type CO) and rubbery copolymers of epichlorohydrin and ethylene oxide (ASTM type ECO). A suitable copolymer may contain a small quantity of a third monomer to introduce enough olefinic unsaturation into the molecule to make the rubber vulcanizable with a sulfur vulcanization system. Epichlorohydrin homopolymer and copolymer rubbers are vulcanized (cross-linked) with difunctional vulcanizing agents such as polyamines including amine-terminated low molecular weight polyamides and thioureas. Examples of suitable vulcanizing agents are hexamethylene diamine carbamate, hexamethylenetetramine, mixed polyamines, 2-mercaptoimidazoline, ethylenethiourea, 1,3-diethylthiourea, piperazine hexahydrate and trimethylthiourea. Unsaturated epichlorohydrin rubbers may also be vulcanized with sulfur cure systems suitable for other low unsaturation diene type rubber. Epichlorohydrin rubber is commercially available under the trademarks Hydrin ® Elastomers and Herchlor ® Rubbers. Epichlorohydrin homopolymer rubber is sold under the tradename of Hydrin 100 and Herchlor H. Epichlorohydrin copolymer rubber is sold under the tradenames of Hydrin 200 and 270 and Herchlor C. Sulfur curable epichlorohydrin copolymer rubber containing about 2% unsaturation is sold under the tradename of Hydrin 400.

Carboxy containing ethylene polymer (herein abbreviated CEP) resins suitable for the practice of the invention may be prepared by polymerization of ethylene and ethenically unsaturated mono- or dicarboxylic acid of 3–8 carbon atoms. The ratio of ethylene to olefinic acid may be varied over a wide range, but preferred resins comprise at least 50 mole percent of ethylene. More preferred CEP resins comprise polymers containing about 1 to 20 weight percent of olefinic acid. Acrylic acid and methacrylic acid are preferred acids. Satisfactory CEP resins are commercially available from Dow Chemical Company under the tradename EEA resin.

Partially or completely neutralizing the acid groups of CEP resin with metal ions give thermoplastic ionomer resin. Examples of thermoplastic ionomer resins suitable for the practice of the invention are described in U.S. Pat. Nos. 3,264,272; 3,322,734; and 3,454,676, the disclosures of which are incorporated herein by reference. A preferred ionomer resin is a copolymer of ethylene and methacrylic acid neutralized with sodium or zinc ion. Satisfactory ionomer resins are commercially available from duPont Company under the tradename Surlyn.

The properties of the compositions of the invention may be modified by addition of ingredients which are conventional in the compounding of epichlorohydrin rubber and CEP resin. Examples of such ingredients include carbon black, silica, titanium dioxide or other pigments, clay, silanes, titanates or other coupling agents, stabilizers, antidegradants, plasticizers, processing aids, adhesives, tackifiers, wax and discontinuous fibers such as wood cellulose or glass fibers, etc. The addition of particulate filler, preferably prior to dynamic vulcanization, is particularly recommended. Preferably, the particulate filler is masterbatched with the epichlorohydrin rubber and the masterbatch is then mixed with the resin. Particulate fillers, such as carbon black or silane-treated silica or clay, improve the tensile strength. Typical additions of particulate fillers or reinforcement fillers such as carbon black comprise about 20–150 parts by weight of filler per 100 parts by weight of rubber. The amount of particulate filler which can be used depends, at least in part, upon the type of filler and the presence of other ingredients such as plasticizers.

Thermoplastic compositions of the invention are useful for making a variety of articles such as tires, hoses, belts, gaskets, moldings and molded parts. They are particularly useful for making articles by extrusion, injection molding and compression molding techniques. Compositions of the invention also are useful for blending with other thermoplastics, such as nylon and polyesters. The compositions of the invention are blended with thermoplastics by using conventional mixing equipment. The properties of the blend depend upon the proportions.

Tensile properties of the compositions are determined by ASTM procedure D638. Specimens are pulled with a tensile tester at 20 inches per minute to failure. The term "elastomeric" as used herein and in the claims means a composition which possesses the property of forcibly retracting within ten minutes to less than 150% of its original length after being stretched at room temperature to twice its unstressed length and held for ten minutes before release. True stress at break (TSB) is the tensile strength at break multiplied by the extension ratio also at break, extension ratio being the length of a tensile test specimen at break divided by the original, unstressed length of the test specimen. Alternatively, extension ratio is 1.00 plus 1/100 of the percent ultimate elongation. Especially preferred compositions of the invention are rubbery compositions having tension set values of about 50% or less. More preferred compositions are compositions having a Shore D hardness of 40 or below or a 100% modulus between 2 and 10 MPa (megapascals) or a Young's modulus below 75 MPa.

DESCRIPTION OF THE PREFERRED EMBODIMENTS

Compositions illustrating the invention are prepared by charging CEP resin and epichlorohydrin rubber, in the indicated amounts (all parts by weight) to a Brabender mixer at 180° C. The epichlorohydrin rubber is Hydrin ® 400 Elastomer, a sulfur vulcanizable grade comprising a copolymer of epichlorohydrin, ethylene oxide and sufficient olefinic monomer to give about 2% residual olefinic unsaturation. The CEP resin is Surlyn 1554, an ionomer resin which is a zinc cation neutralized ethylene-methacrylic acid copolymer having a melt flow index of 1.0 decigrams. The compositions are mixed for two minutes after the CEP resin is melted; they are then removed from the mixer, cooled, returned to the mixer and mixed for 2–2½ additional minutes. Test specimens are prepared by compression molding at 210°–220° C. and then evaluated. Compositions containing cross-linked epichlorohydrin rubber are prepared in a similar manner except after the CEP resin melts and a blend is formed, a low molecular weight liquid polyamide cross-linking agent, Versamid 140, having an amine number of 370–400 is added and mixing is continued until maximum consistency is reached. In Stock 1, 5 parts by weight of cross-linking agent are used per 100 parts by weight of epichlorohydrin rubber. In Stocks 2–9, 10 parts by weight of cross-linking agents are used. The composition is removed from the mixer, cooled, then returned to the mixer and mixed for 2–2½ additional minutes. Test specimens are prepared by compression molding as above. The effect of the proportions of epichlorohydrin rubber and CEP resin in the blend is shown in Table 1. All compositions are processable as thermoplastics. The properties of blends in which the rubber is cross-linked are shown in parentheses. The properties indicate that the two polymers are sufficiently compatible over the entire range of proportions. The data also show that compositions comprising cured rubber are elastomeric over the entire range of proportions. Cross-linking the rubber in the blend also increases the tensile strength of compositions comprising up to 80 weight percent of CEP resin.

Compositions of the invention containing CEP resins, which are not neutralized, are illustrated in Tables 2 and 3. The epichlorohydrin rubber is the same as in Table 1. The blends of Table 2 contain a CEP resin, designated EEA resin 455, which is an ethylene acrylic acid copolymer containing about 8% acrylic acid and having a melt index of 5.5. The blends of Table 3 contain a CEP resin, designated EEA resin 435, which is an ethylene acrylic acid copolymer containing about 3.5% acrylic acid and having a melt index of 11. The compositions are prepared by the same procedure as in Table 1. The properties of blends in which the rubber is cross-linked are shown in parentheses. The data indicate that the blends of Table 2 containing a CEP resin containing higher proportions of acid are superior to the compositions of Table 3.

TABLE 1

|  | 1 | 2 | 3 | 4 | 5 | 6 | 7 | 8 | 9 |
|---|---|---|---|---|---|---|---|---|---|
| Epichlorohydrin Rubber | 90 | 80 | 70 | 60 | 50 | 40 | 30 | 20 | 10 |
| Surlyn 1554 Resin | 10 | 20 | 30 | 40 | 50 | 60 | 70 | 80 | 90 |
| Properties |  |  |  |  |  |  |  |  |  |
| TS, MPa | 0.2 | 0.6 | 1.6 | 4.6 | 10.1 | 12.0 | 14.3 | 14.9 | 23.9 |
|  | (2.8) | (5.9) | (10.0) | (13.0) | (16.9) | (16.0) | (16.6) | (20.0) | (21.8) |
| $M_{100}$, MPa | 0.3 | 0.8 | — | 4.5 | 8.6 | 8.9 | 10.3 | 12.3 | 14.4 |
|  | (1.8) | (4.0) | (5.4) | (6.2) | (9.1) | (10.2) | (11.0) | (12.3) | (13.0) |
| E, MPa | 0.4 | 1.6 | 5.0 | 14.5 | 72 | 82 | 123 | 117 | 150 |
|  | (0.5) | (1.1) | (27.9) | (64.0) | (72) | (111) | (140) | (148) | (162) |
| Elong., % | 400 | 240 | 100 | 110 | 210 | 280 | 300 | 230 | 390 |
|  | (180) | (160) | (210) | (340) | (370) | (330) | (320) | (370) | (370) |
| Tension Set, % | 37 | 34 | Failed | Failed | 40 | 38 | 40 | Failed | Failed |
|  | (5) | (10) | (15) | (26) | (38) | (42) | (39) | (40) | (38) |
| TSB, MPa | 0.9 | 2.1 | 3.3 | 9.7 | 31.6 | 45.6 | 56.5 | 49.0 | 117 |
|  | (7.8) | (15.1) | (31.3) | (57.3) | (78.7) | (68.5) | (69.8) | (93.2) | (104) |
| Shore D Hardness | 6 | 10 | 12 | 24 | 33 | 35 | 40 | 37 | 45 |
|  | (12) | (22) | (30) | (33) | (36) | (39) | (40) | (45) | (48) |

TABLE 2

|  | 1 | 2 | 3 | 4 | 5 | 6 | 7 | 8 |
|---|---|---|---|---|---|---|---|---|
| Epichlorohydrin Rubber | 90 | 80 | 70 | 60 | 40 | 30 | 20 | 10 |
| EEA Resin 455 | 10 | 20 | 30 | 40 | 60 | 70 | 80 | 90 |
| Versamid 140 | 4.5 | 8 | 7 | 6 | 4 | 3 | 2 | 1 |
| Properties |  |  |  |  |  |  |  |  |
| TS, MPa | 0.1 | 0.8 | 0.7 | 4.0 | 8.6 | 10.5 | 10.2 | 12.8 |
|  | (2.0) | (6.6) | (9.2) | (10.9) | (13.8) | (11.9) | (13.8) | (13.8) |
| $M_{100}$, MPa | 0.2 | — | 0.6 | 3.4 | 5.4 | 6.3 | 7.1 | 7.6 |
|  | (1.2) | (3.2) | (4.5) | (5.0) | (6.7) | (8.3) | (8.5) | (8.6) |
| E, MPa | 0.9 | 2.3 | 2.3 | 14.3 | 31.4 | 41.0 | 53.6 | 73.7 |
|  | (1.4) | (5.5) | (14.2) | (24.7) | (41.0) | (57.6) | (61.1) | (75.3) |
| Elong., % | 150 | 100 | 100 | 220 | 430 | 970 | 400 | 480 |
|  | (210) | (230) | (260) | (307) | (370) | (300) | (390) | (470) |
| Tension Set, % | 64 | Failed | Failed | 30 | 24 | 25 | 27 | 26 |
|  | (3) | (10) | (15) | (18) | (24) | (26) | (25) | (25) |
| TSB, MPa | 0.2 | 1.6 | 1.3 | 12.8 | 45.7 | 59.2 | 50.8 | 74.6 |
|  | (6.2) | (21.4) | (33.6) | (44.4) | (64.2) | (47.2) | (67.6) | (78.3) |

TABLE 3

|  | 1 | 2 | 3 | 4 | 5 | 6 | 7 | 8 |
|---|---|---|---|---|---|---|---|---|
| Epichlorohydrin Rubber | 90 | 80 | 70 | 60 | 40 | 30 | 20 | 10 |
| EEA Resin 435 | 10 | 20 | 30 | 40 | 60 | 70 | 80 | 90 |
| Versamid 140 | 4.5 | 8 | 7 | 6 | 4 | 3 | 2 | 1 |
| Properties |  |  |  |  |  |  |  |  |
| TS, MPa | 0.3 | 0.4 | 2.1 | 3.5 | 5.3 | 5.7 | 8.2 | 11.0 |
|  | (4.3) | (6.5) | (6.4) | (6.9) | (7.6) | (7.9) | (8.9) | (8.7) |
| $M_{100}$, MPa | 0.3 | — | 2.0 | 3.3 | 5.1 | 5.6 | 6.9 | 7.8 |
|  | (1.6) | (3.3) | (3.5) | (3.8) | (5.2) | (5.9) | (6.6) | (7.5) |

TABLE 3-continued

|  | 1 | 2 | 3 | 4 | 5 | 6 | 7 | 8 |
| --- | --- | --- | --- | --- | --- | --- | --- | --- |
| E, MPa | 0.7 | 0.9 | 9.2 | 18.4 | 44.5 | 61.4 | 64.1 | 83.4 |
|  | (10.3) | (19.9) | (15.7) | (25.4) | (43.3) | (59.0) | 77.0 | (87.4) |
| Elong., % | 130 | 80 | 120 | 190 | 250 | 200 | 420 | 500 |
|  | (310) | (360) | (300) | (340) | (360) | (370) | (420) | (420) |
| Tension Set, % | Failed | Failed | Failed | 38 | 33 | 39 | 39 | 33 |
|  | (9) | (12) | (17) | (16) | (25) | (28) | (35) | (35) |
| TSB, MPa | 0.7 | 0.8 | 4.5 | 10.1 | 18.4 | 17.5 | 42.8 | 66.2 |
|  | (17.7) | (29.8) | (25.9) | (30.2) | (35.4) | (37.1) | (46.4) | (45.1) |

TABLE 4

(ALL PARTS BY WEIGHT)

|  | 1 | 2 | 3 |
| --- | --- | --- | --- |
| Epichlorohydrin Rubber | 50 | 50 | 50 |
| Surlyn 1652 Resin | 50 | 50 | 50 |
| Versamid 140 | — | 5 | — |
| Benzothiazoyl disulfide | — | — | 1 |
| Sulfur | — | — | 0.4 |
| Zinc Stearate | — | 1.67 | 1.67 |
| Properties |  |  |  |
| TS, Mpa | 7.3 | 13.2 | 9.7 |
| $M_{100}$, MPa | 5.7 | 7.0 | 5.4 |
| E, MPa | 34 | 36 | 40 |
| Elong., % | 290 | 340 | 500 |
| Tension Set, % | 31 | 18 | 30 |
| TSB, MPa | 29 | 59 | 59 |
| Shore D Hardness | 29 | 30 | 29 |

Comparison of the data of Tables 1 and 2 indicate that blends containing neutralized CEP resin (ionomer resin) exhibit better properties than similar blends containing non-neutralized CEP resin.

Compositions comprising blends of a different type of ionomer resin, Surlyn 1652, a zinc cation neutralized ethylene-methacrylic acid copolymer having a melt flow index of 5.0 desigrams, are illustrated in Table 4. The epichlorohydrin rubber is the same as in Table 1. Stock 1 is a blend containing uncured rubber. Stock 2 is a blend in which the rubber is cured by a polyamide cross-linking agent, Versamid 140. Stock 3 is a blend in which the rubber is cured by a curative system comprising sulfur, zinc stearate, and benzothiazoyl disulfide. The blends are prepared by the same procedure as in Table 1. The data show that the polymers are sufficiently compatible and that compositions exhibiting a useful combination of properties are obtained. The improvements due to two types of cross-linking agents are demonstrated.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. An elastoplastic composition comprising a blend of carboxy containing ethylene polymer (CEP) resin comprising at least 50 mole percent of ethylene, in an amount sufficient to impart thermoplasticity to the composition, and cross-linked epichlorohydrin rubber in the form of dispersed particles of a size small enough to maintain thermoplasticity of the composition and which rubber is present in an amount sufficient to impart rubberlike elasticity so that the composition has a tension set value of about 50% or less, said cross-linked epichlorohydrin rubber being obtained by dynamic vulcanization of the blend or by vulcanization of the rubber prior to forming the blend.

2. The composition of claim 1 comprising about 15–85 parts by weight of CEP resin and correspondingly, about 85–15 parts by weight of cross-linked epichlorohydrin rubber.

3. The composition of claim 2 in which the cross-linked rubber particles are of a size of about 50 microns number average or less.

4. The compositions of claim 3 in which the cross-linked rubber particle size is about 0.1–10 microns number average, and said cross-linked rubber is obtained by dynamic vulcanization of the blend.

5. The composition of claim 4 in which the rubber is cross-linked to the extent that the cross-link density of the rubber is about $3 \times 10^{-5}$ to $3 \times 10^{-4}$ moles per milliliter of rubber.

6. The composition of claim 5 in which the CEP resin is at least partially neutralized with metal ions.

7. The composition of claim 6 in which the neutralized CEP resin is a copolymer of ethylene and methacrylic acid.

8. The composition of claim 7 in which the epichlorohydrin rubber is a copolymer of epichlorohydrin and ethylene oxide.

9. The composition of claim 8 in which the epichlorohydrin rubber is cross-linked by a low molecular weight polyamide cross-linking agent.

10. The composition of claim 5 in which the CEP resin is a copolymer of ethylene and acrylic acid.

11. The composition of claim 10 in which the CEP resin comprises about 5–10 percent acrylic acid.

* * * * *